US009098678B2

(12) United States Patent
Hao et al.

(10) Patent No.: US 9,098,678 B2
(45) Date of Patent: Aug. 4, 2015

(54) STREAMING VIDEO AUTHENTICATION

(75) Inventors: Jack Jianxiu Hao, Lexington, MA (US); Fang Zhu, Woburn, MA (US); Fenglin Yin, Lexington, MA (US); Diego S. Rozensztejn, Brighton, MA (US); Ashraf Shehata, Tampa, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 106 days.

(21) Appl. No.: 13/233,286

(22) Filed: Sep. 15, 2011

(65) Prior Publication Data

US 2013/0074168 A1    Mar. 21, 2013

(51) Int. Cl.
| G06F 7/04 | (2006.01) |
| G06F 15/16 | (2006.01) |
| G06F 17/30 | (2006.01) |
| H04L 29/06 | (2006.01) |
| G06F 21/10 | (2013.01) |
| H04L 9/32 | (2006.01) |
| G06F 21/33 | (2013.01) |
| G06F 21/34 | (2013.01) |

(52) U.S. Cl.
CPC .............. *G06F 21/10* (2013.01); *G06F 21/33* (2013.01); *G06F 21/34* (2013.01); *H04L 9/3213* (2013.01); *H04L 9/3234* (2013.01); *H04L 2209/60* (2013.01)

(58) Field of Classification Search
CPC ........... G06F 8/60; G06F 8/61; G06F 21/105; G06F 21/121; G06F 21/128; G06F 21/44; G06F 21/445; H04L 63/0853; H04L 63/0876; H04L 63/18; H04L 12/1822; H04L 12/1813; H04L 12/1818; H04L 29/08981; H04L 65/1069; H04L 65/1073; H04L 65/4069; H04L 67/10; H04N 21/2668
See application file for complete search history.

(56) References Cited

U.S. PATENT DOCUMENTS

| 5,724,425 | A  | * | 3/1998 | Chang et al. ................. 705/52 |
| 8,291,504 | B2 | * | 10/2012 | Padinjareveetil ............ 726/26 |
| 2003/0097564 | A1 | * | 5/2003 | Tewari et al. ................ 713/171 |
| 2004/0083297 | A1 | * | 4/2004 | Gazzetta et al. ............. 709/229 |
| 2009/0228576 | A1 | * | 9/2009 | Rosenan et al. ............. 709/221 |
| 2010/0046752 | A1 | * | 2/2010 | Fahrny et al. ................ 380/210 |
| 2010/0188485 | A1 | * | 7/2010 | Abrams ....................... 348/46 |
| 2011/0092185 | A1 | * | 4/2011 | Garskof ....................... 455/411 |
| 2011/0145932 | A1 | * | 6/2011 | Nerger et al. ................. 726/29 |
| 2011/0179411 | A1 | * | 7/2011 | Lederer ....................... 717/178 |
| 2011/0265149 | A1 | * | 10/2011 | Ganesan ..................... 726/4 |
| 2013/0347129 | A1 | * | 12/2013 | Samuelsson et al. ......... 726/28 |

* cited by examiner

*Primary Examiner* — Andrew Nalven
*Assistant Examiner* — Quy Pham

(57) ABSTRACT

One or more devices transmit, to a user device, an application for secure mobile streaming, and receive, from the user device, a registration request for the application. The registration request includes a user ID and a unique device identifier (UDID) for the user device. The one or more devices initiate a validation procedure for the user ID or UDID. When the user ID or UDID is validated, the one or more devices generate a device-token for the user device. The device-token includes a hash value based on information in the registration request and an expiration date for the device-token. The one or more devices send the device-token to the user device via a private network. The device-token is required to permit the user device to receive a secure content stream via a public network.

18 Claims, 8 Drawing Sheets

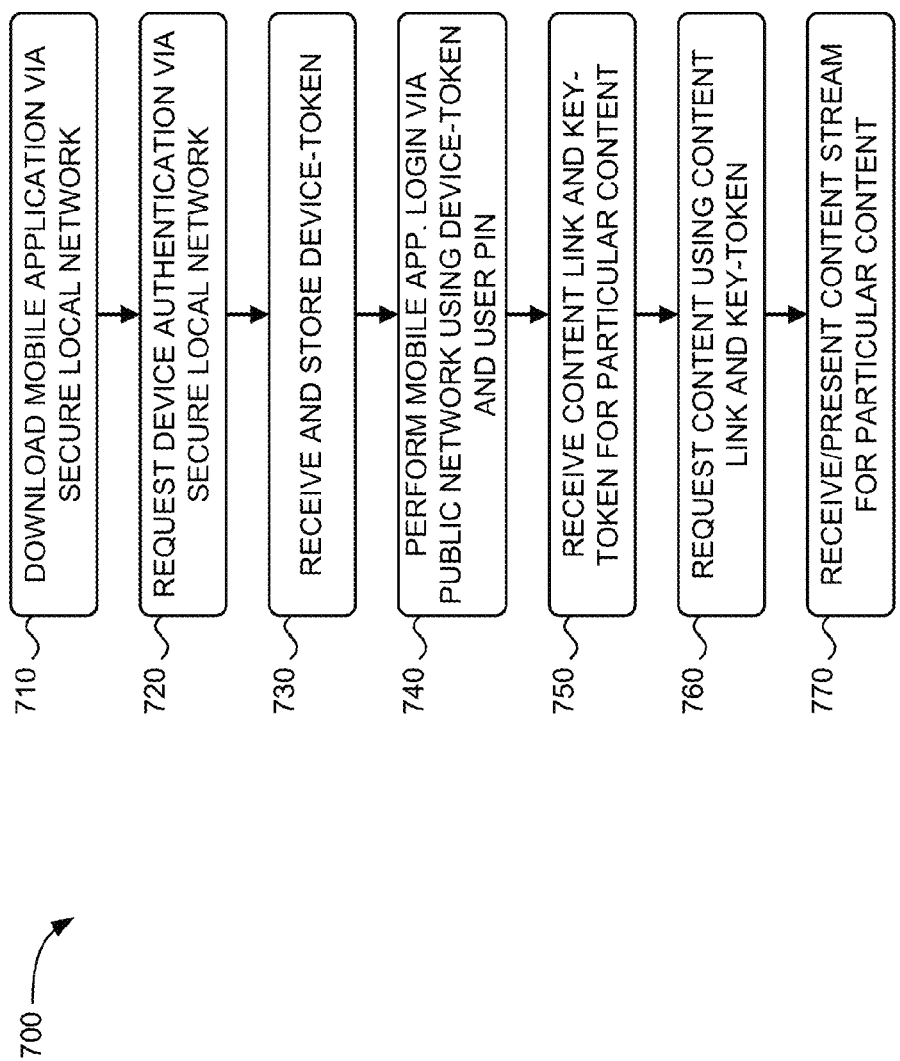

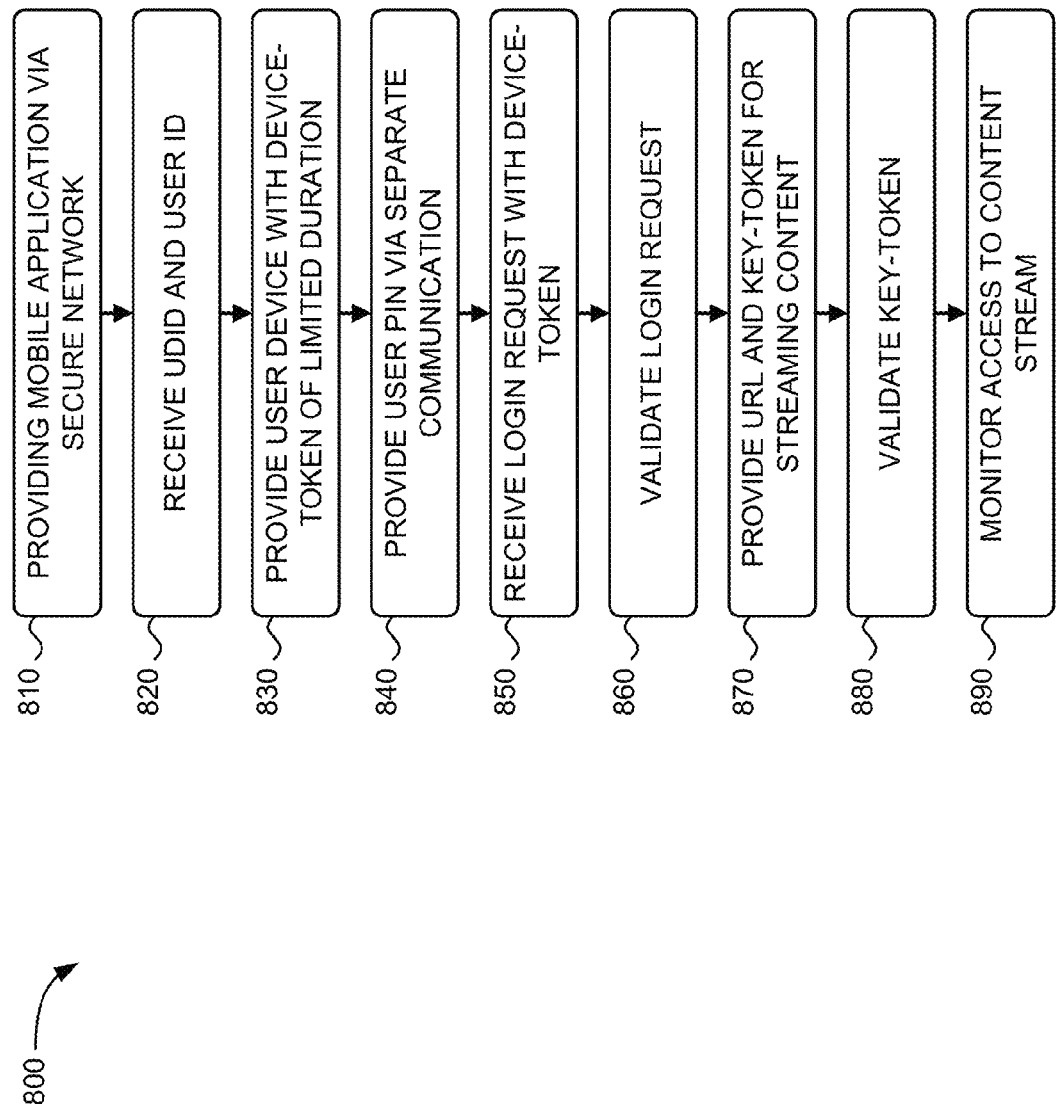

STREAMING VIDEO AUTHENTICATION

BACKGROUND

Streaming of certain live video content, such as company quarterly broadcast, often has company proprietary information and, therefore, may be restricted to viewing only through a company's private network (e.g., an intranet) within a particular facility or through a virtual private network (VPN) over Internet connections. In some cases, VPN access may not be a solution for people on the go, since the company may not have a VPN client running on some mobile smart phones or tablet devices. Subsequently, viewing company live broadcasts is a challenge for people on the go.

BRIEF DESCRIPTION OF THE DRAWINGS

FIG. 7 is a flow chart of an exemplary process for obtaining secure streaming content according to an implementation described herein; and FIG. 8 is a flow chart of an exemplary process for providing secure streaming content to user devices according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable users of mobile devices to consume private information (e.g., private streaming video) on a public network via reliable and secure applications. Users may register for and download a mobile application for their mobile device(s) using a private network connection. The mobile application may later be used to access private video content over a public network after executing a validation process.

In one implementation, the systems and/or methods may transmit, to a user device, an application for secure mobile streaming, and may receive, from the user device, a registration request for the application. The registration request may include a user ID and/or a unique device identifier (UDID) for the user device. The systems and/or methods may initiate a validation procedure for the user ID and/or UDID. When the user ID and/or UDID is validated, the systems and/or methods may generate a device-token for the user device. The device-token may include a hash value based on information in the registration request and an expiration date for the device-token. The systems and/or methods may send the device-token to the user device via a private network. The device-token can be required later to permit the user device to receive a secure content stream via a public network.

Figure 1:
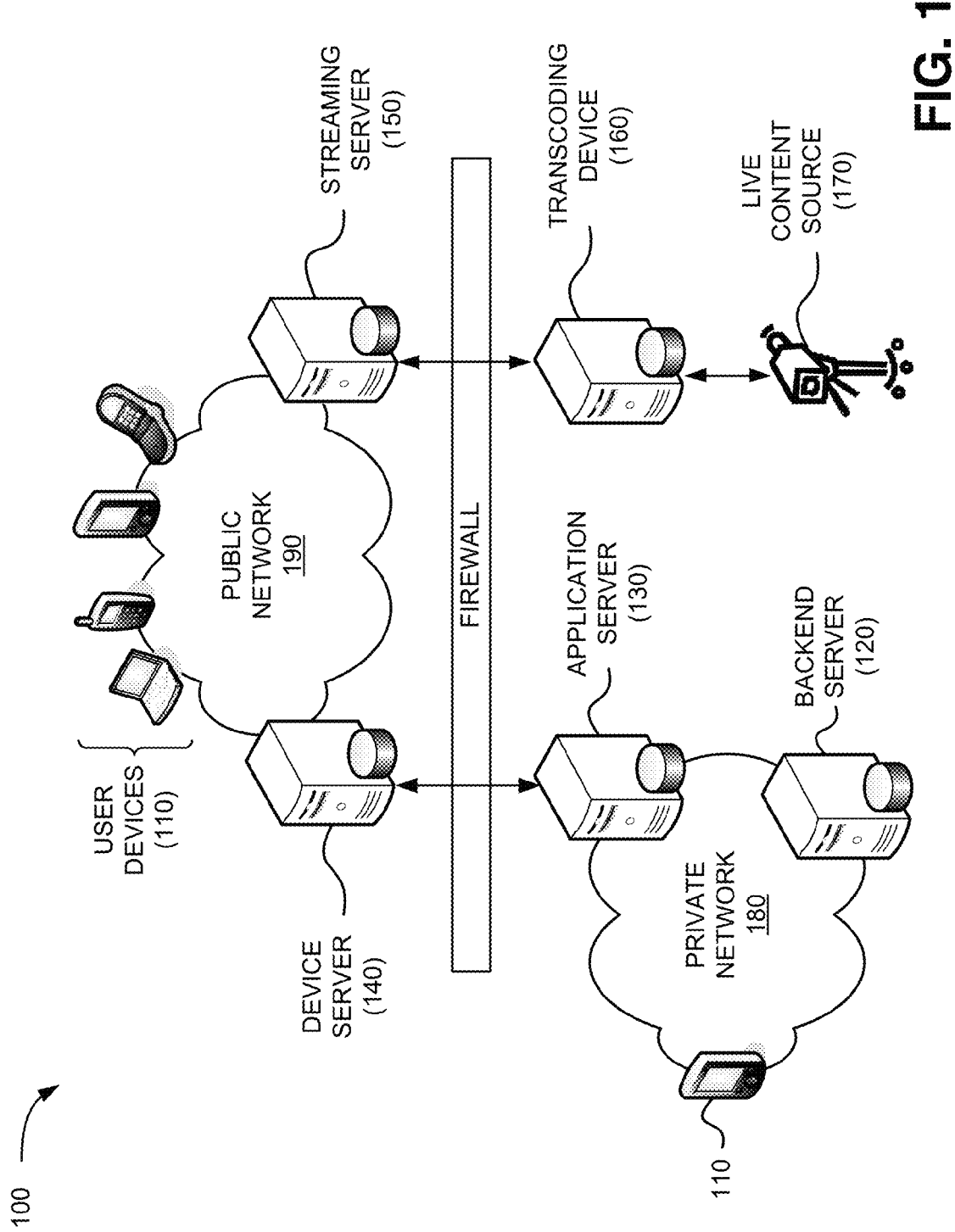
FIG. 1 is an exemplary network in which systems and/or methods described herein may be implemented.

FIG. 1 is an exemplary network 100 in which systems and/or methods described herein may be implemented. As illustrated, network 100 may include user devices 110, a backend server 120, an application server 130, a device server 140, a streaming server 150, a transcoding device 160, a live content source 170, a private network 180, and a public network 190. The particular arrangement and number of components of network 100 shown in FIG. 1 are illustrated for simplicity. In practice there may be more user devices 110, backend servers 120, application servers 130, device servers 140, streaming servers 150, transcoding devices 160, live content sources 170, private networks 180, and/or public networks 190. Components of network 100 may be connected via wired and/or wireless links.

User device 110 may include a personal communications system (PCS) terminal (e.g., a smartphone that may combine a cellular radiotelephone with data processing and data communications capabilities), a personal digital assistant (PDA) (e.g., that can include a radiotelephone, a pager, Internet/intranet access, etc.), a tablet computer, a radiotelephone, a personal computer, a laptop, a gaming console, a set-top box, an Internet television, or other types of computation or communication devices. In one implementation, user device 110 may include any device that is capable of accessing and storing a mobile application (e.g., provided by application server 130) that enables a user of user device 110 to consume live streaming video content. In one implementation, each user device 110 may store a unique device identifier (UDID) or a call function to retrieve a UDID.

Backend server 120 may include one or more server devices, or other types of computation or communication devices, to provide provisioning information for users and/or devices associated with private network 180. In one implementation, backend server 120 may include user profiles, employment information, and/or subscription information that can be used to validate a user that requests access to the mobile application. For example, backend server 120 may include a single sign-on database that provides access to a user's email address, mobile number, and/or mailing address. As another example, backend server 120 may include customer billing information. Backend server 120 may communicate, for example, with application server 130 via secure network channels.

Application server 130 may include one or more server devices, or other types of computation or communication devices, to provide mobile application downloads and conduct user registrations. In one implementation, application server 130 may validate users based on security information from backend server 120. For example, application server 130 may prompt a user to provide private information that matches information stored in backend server 120. As described further herein, application server 130 may also generate a device-token for user devices 110 and a separate user personal identification number (PIN) for validated users. Application server 130 may publish the device-token and the user PIN to device server 140 for authentication during live broadcasting operations.

In another implementation, application server 130 may also define the configuration protocols for the live broadcasting operations, such as how many users can register in one region and how many users can connect to one mobile tower to avoid a traffic jam, etc. Additionally, application server 130 may store, in a database, the locations of serving WiFi nodes and user device 110 locations for WiFi offloading from wireless 3G/4G networks.

Device server 140 may include one or more server devices, or other types of computation or communication devices, to authenticate user devices 110 and provide a streaming URL (e.g., for live broadcasting content) to authenticated devices.

Authentication may be based on the device-token and user PIN generated by application server 130 during registration of user device 110. Device server 140 may withhold sending the streaming URL to user devices 110 that fail authentication. In one implementation, device server 140 may also communicate with application server 130 to implement the configuration protocols for the live broadcasting operations and to locate available WiFi/MiFi networks to permit offloading traffic from wireless 3G/4G networks.

Streaming server 150 may include a server device, such as a computer device, and/or a network device, such as a router, that provides streaming data packets to user device 110 (e.g., via public network 190). In one implementation, after user device 110 is authenticated, streaming server 150 may securely stream video content (e.g., via the streaming URL) directly to user device 110. Streaming server 150 may receive a request for streaming content from user device 110 and may continue to provide streaming content to user device 110 until the particular requested content is received or user device 110 terminates a connection with streaming server 150. In one implementation, the streaming URL may be session-based, such that each URL can be used only once for one user device for security purpose.

Transcoding device 160 may include one or more server devices and/or network devices that transcode (or convert) video content to a format that user device 110 may utilize (e.g., playback). For example, transcoding device 160 may convert an audio, video, or graphic file from one format to another (e.g., from one bit rate to another bit rate, from one resolution to another, from one standard to another, from one file size to another, etc.

Live content source 170 may include one or more devices to broadcast a live streaming feed. The streaming feed may be, for example, analog or digital format.

Private network 180 may include a one or more private IP networks that use a private IP address space. Private network may include a local area network (LAN), an intranet, a private wide area network (WAN), etc. In one implementation, private network 180 may implement one or more Virtual Private Networks (VPNs) for providing communication between, for example, between application server 130 and user devices 110. Private network 180 may be protected/separated from other networks, such as public network 190, by a firewall. While user device 110, backend server 120, and application server 130 are shown within private network 180 in FIG. 1, in other implementations, transcoding device 160 and live content source 170 may also be included within private network 180.

Public network 190 may include a WAN, an intranet, a telephone network (e.g., the Public Switched Telephone Network), or a combination of networks. Public network 190 may include, for example, an untrusted network, such as the Internet. Public network 190 may further include transport and/or network devices such as routers, switches, and/or firewalls.

In implementations described herein, user device 110 may connect to application server 130 via private network 180 to register user device 110 and request a user PIN. Once user device 110 is registered, application server 130 may provide a mobile application and unique device-token (or session cookie) to store in user device 110. The device-token may have a limited lifetime. The user PIN may be provided via a separate communication method (e.g., via a user's email account). When user device 110 is not connected to private network 180, user device 110 may use the provided mobile application and public network 190 to access device server 140. Device server 140 may use the device-token and user PIN to authenticate user device 110, and may provide a URL to allow user device 110 to access protected content.

Figure 2:
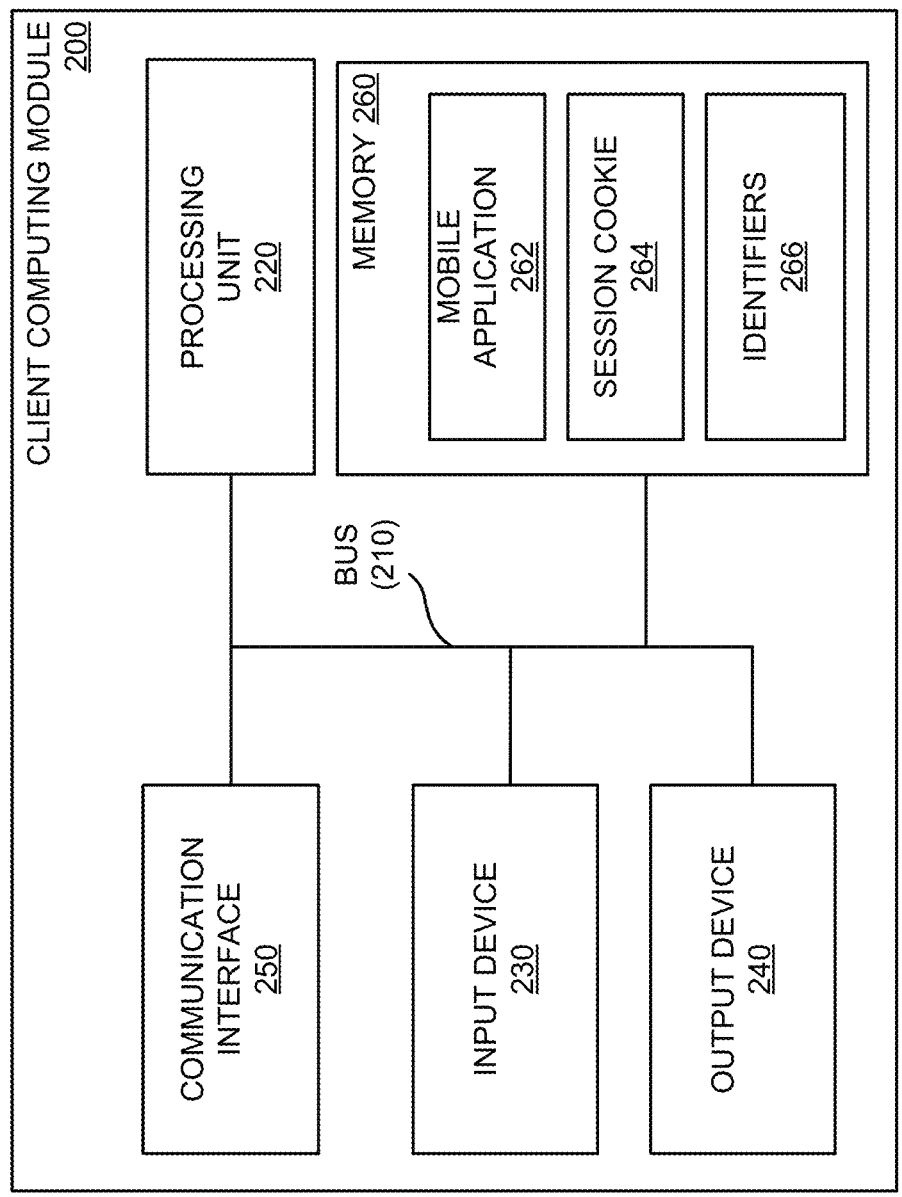
FIG. 2 is a block diagram of exemplary components of a client computer module.

FIG. 2 is a block diagram of exemplary components of a client computing module 200 that may correspond to one or more of user devices 110. User devices 110 may each include one or more computing modules 200. Client computing module 200 may include a bus 210, processing logic 220, an input device 230, an output device 240, a communication interface 250, and a memory 260. Client computing module 200 may include other components (not shown) that aid in receiving, transmitting, and/or processing data. Moreover, other configurations of components in client computing module 200 are possible.

Bus 210 may include a path that permits communication among the components of client computing module 200. Processing unit 220 may include any type of processor or microprocessor (or groups of processors or microprocessors) that interprets and executes instructions. In other embodiments, processing unit 220 may include an application-specific integrated circuit (ASIC), a field-programmable gate array (FPGA), or the like.

Input device 230 may include a device that permits a user to input information into client computing module 200, such as a keyboard, a mouse, a pen, a, a remote control, a touch-screen display, etc. Output device 240 may include a device that outputs information to the user, such as a display, a speaker, etc. Output device 240 may also include a vibrator to alert a user.

Input device 230 and output device 240 may allow the user to activate a particular service or application, such as a visual voicemail application and/or service. Input device 230 and output device 240 may allow the user to receive and view a menu of options and select from the menu options. The menu may allow the user to select various functions or services associated with applications executed by client computing module 200.

Communication interface 250 may enable client computing module 200 to communicate with other devices and/or systems. Communication interface 250 may include a transmitter that may convert baseband signals to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communications interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface for communicating with Bluetooth devices, a near-field communication (NFC) interface, etc. Communication interface 250 may implement a wireless communication protocol, e.g., LTE, GSM, CDMA, WCDMA, GPRS, EDGE, etc. Communications interface 250 may also receive, transmit and/or process digital or analog audio inputs/outputs and/or digital or analog video inputs/outputs.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing unit 220; and/or some other type of magnetic or optical recording medium and its corresponding drive, e.g., a hard disk drive (HDD), for storing information and/or instructions.

Consistent with implementations described herein, memory 260 may include a mobile application 262, a session cookie 264, and identifiers 266. Mobile application 262 may obtain and store registration/authentication information that may allow a user to obtain, receive, and consume streaming video content. In some instances, mobile application 262 may cause user device 110 to automatically retrieve unique identifiers for user device 110 and to automatically request authentication. Session cookie 264 may store tokens (e.g., key-tokens) that may be required to access secure streaming content. Identifiers 266 may include application identifiers (e.g., device-tokens), device identifiers and/or user identifiers that may be required to authenticate user device 110 and/or users of user device 110.

As described herein, client computing module 200 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Figure 3:
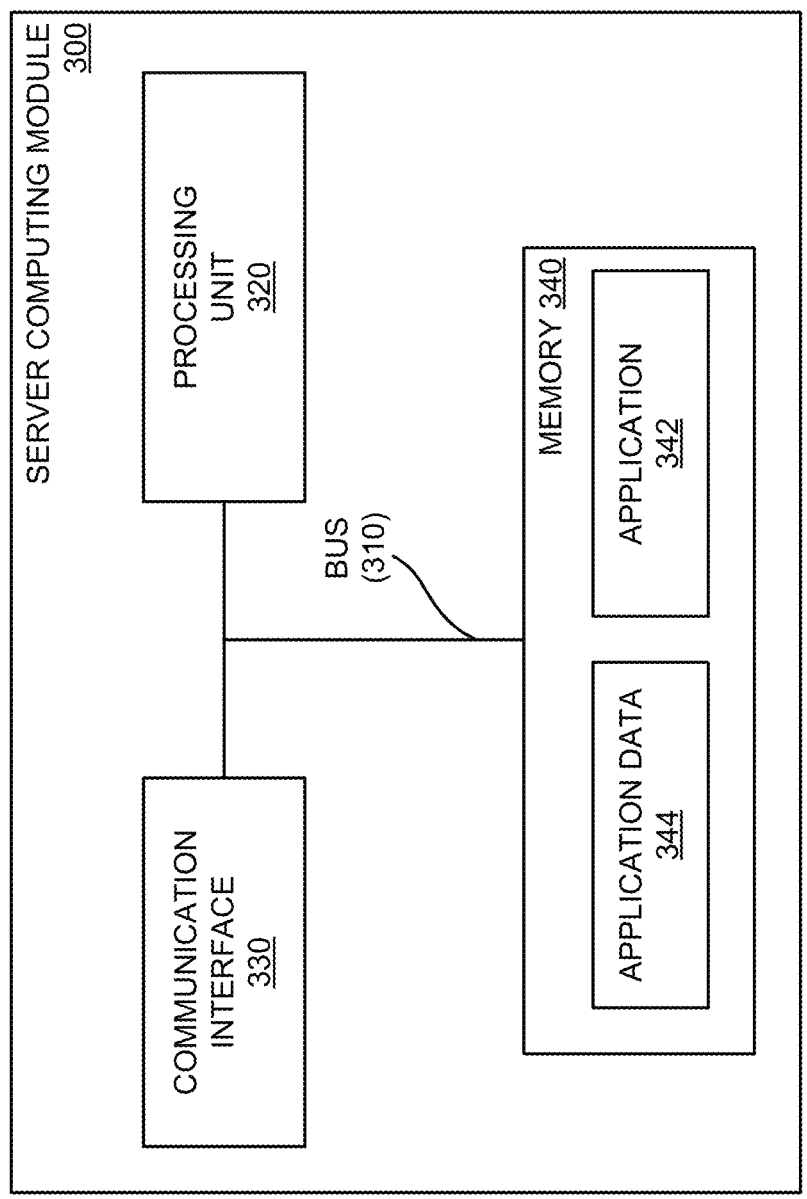
FIG. 3 is a block diagram of exemplary components of a server computing module.

FIG. 3 is a block diagram of exemplary components of a server computing module 300 that may correspond to one or more of components 120-160. Each of components 120-160 may include one or more server computing modules (e.g., a rack of server computer modules), such as computing module 300. Server computing module 300 may include a bus 310, processing logic 320, a communication interface 330, and a memory 340. Server computing module 300 may include other components (not shown) that aid in receiving, transmitting, and/or processing data. Moreover, other configurations of components in module 300 are possible.

Bus 310 may include a path that permits communication among the components of module 300. Processing unit 320 may include any type of processor or microprocessor (or groups of processors or microprocessors) that interprets and executes instructions. In other embodiments, processing unit 320 may include an ASIC, an FPGA, or the like.

Communication interface 330 may enable module 300 to communicate with other devices and/or systems. For example, communication interface 300 may include mechanisms similar to those described above for communication interface 250 for communicating with other devices, such as other devices of network 100.

Memory 340 may include a RAM or another type of dynamic storage device that may store information and instructions, e.g., an application 342 and application data 344, for execution by processing unit 320; a ROM device or another type of static storage device that may store static information and instructions for use by processing unit 320; and/or some other type of magnetic or optical recording medium and its corresponding drive, e.g., a HDD, for storing information and/or instructions.

In the case of application server 130, for example, application 342 may include an application to register mobile applications for secure mobile streaming and/or generate device-tokens. Application data 344 may include tables and/or data corresponding to items from application 342, such as user device and/or user identifiers, available WiFi locations, a number of allowed connections for particular streaming content, etc.

In the case of device server 140, for example, application 342 may include an application to authenticate registered user devices 110. As such, in the case of device server 140, application data 344 may also include user device and/or user identifiers, links to content streams, etc.

Module 300 may perform certain operations, as described in detail below. Module 300 may perform these operations in response to processing unit 320 executing software instructions contained in a computer-readable medium, such as memory 340. The software instructions may be read into memory 340 from another computer-readable medium or from another device via communication interface 330. The software instructions contained in memory 340 may cause processing unit 320 to perform processes that are described below.

Figure 4:
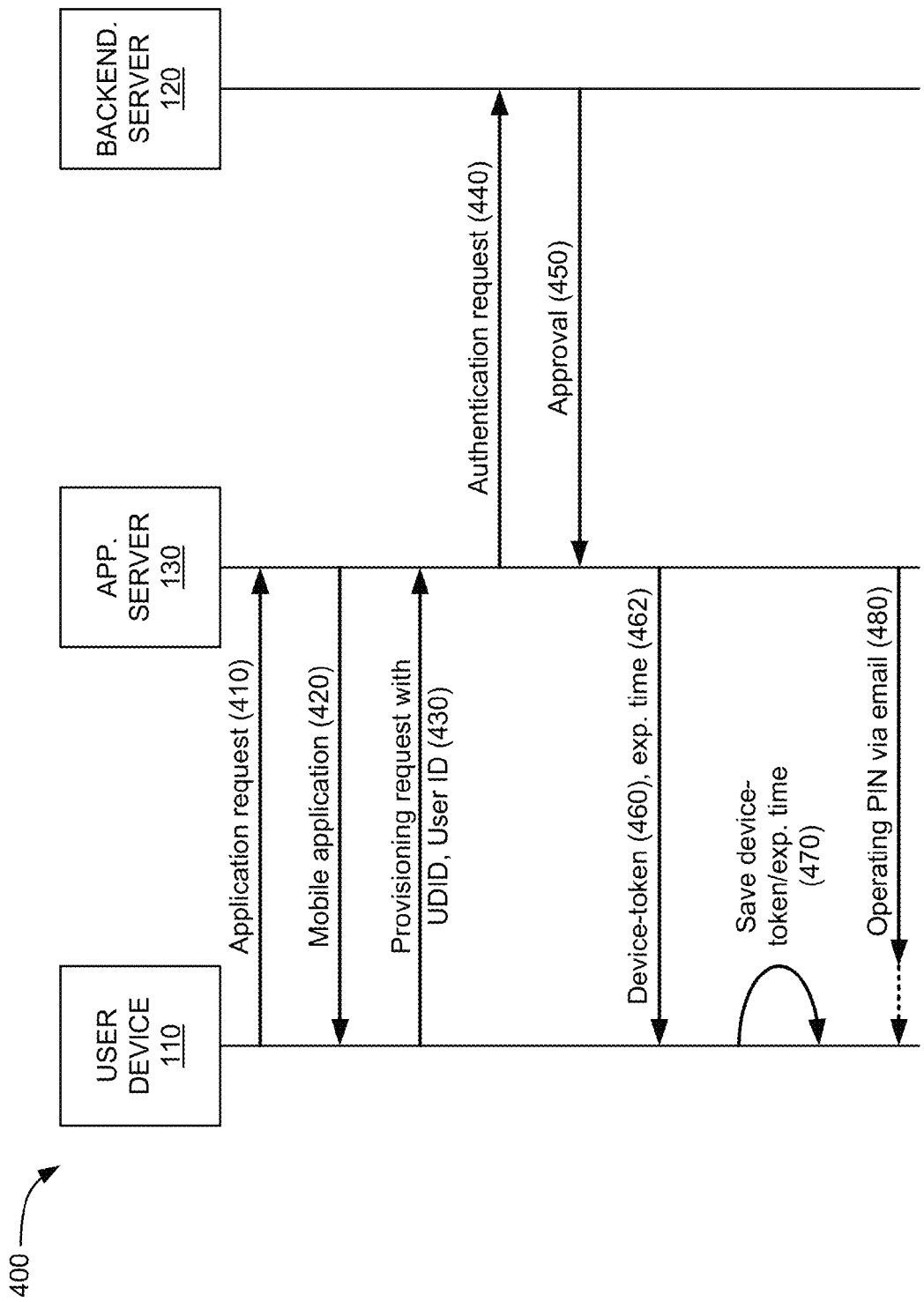
FIG. 4 is a diagram of exemplary communications within a portion of the network of FIG. 1.

FIG. 4 is a diagram of exemplary communications for a portion 400 of network 100. Communications in FIG. 4 may represent registration procedures for obtaining access to secure streaming video. As shown in FIG. 4, network portion 400 may include user device 110, backend server 120, and application server 130. User device 110, backend server 120, and application server 130 may include features described above in connection with, for example, FIGS. 1-3.

Communications described in FIG. 4 may take place in a secure environment, such as private network 180. For example, user device 110 may connect to a WiFi network in a company's office or to a WiFi connection in a private home network. In another implementation, user device 110 may connect to application server 130 via a VPN connection.

As shown in FIG. 4, user device 110 may send an application request 410 to application server 130 to download a mobile application that will manage secure provisioning and mobile access to streaming video content. Application server 130 may respond to request 410 by downloading or otherwise delivering a mobile application 420 to user device 110. In one implementation, mobile application 420 may be downloaded to user device 110 from a URL that is only accessible from a company intranet. User device 110 may install mobile application 420, which may initiate a registration process.

To start the registration process, user device 110 may send to application server 130 a provisioning request 430 that includes a UDID and a user ID. The UDID may be obtained, for example, through an original equipment manufacturer (OEM) API function call. The user ID may be a unique character string, such as an email address, MDN, or another authentic credential. The user ID may be input by a user (e.g., as prompted by the mobile application) and/or may be saved in memory (e.g., memory 260) of user device 110.

Application server 130 may receive provisioning request 430 and may, in response, send an authentication request 440 to backend server 120. Authentication request 440 may validate the user ID (e.g., including, optionally, a user password) to make sure the user is entitled to access the secure mobile streaming service. If the user is not authorized to access the service, backend server 120 may not authenticate the user and application server 130 may deny (not shown) the provisioning request 430. Assuming the user is authorized to access the service, backend server 120 may provide an approval 450 to application server 130.

Based on approval 450, application server 130 may generate a device-token 460 using, for example, a hash algorithm. The hash value for device-token 460 may include the UDID, the user ID, secret data, and an expiration time 462. The UDID and the user ID may be the values included by user device 110 in provisioning request 430. The secret data and expiration time 462 may be added from the server side (e.g., application server 130). The secret data may be information known only to application server 130. The secret data may be, for example, a random number or a predefined constant parameter for server communication efficiency that only application server 130 may understand, such as a type of service being embedded into the parameters. Expiration time 462 may be a date and time or a time period after which the device-token is set to expire. Expiration time 462 may be a value configured by, for example, a network administrator based on remote network access and travel tendencies of users. In one implementation, expiration time 462 may be configured differently for each mobile application 420. In one implementation, application server 130 may store device-token 460 locally (e.g., in memory 340) and forward device-token 460 and expiration time 462 to user device 110. In another implementation, application server 130 may store the hash algorithm and expiration date 462, but not the actual device-token 460.

User device 110 (e.g., running the mobile application) may save device-token 460 and expiration time 462 in local memory (e.g., memory 260) for future use, as indicated by reference number 470. Also in response to approval 450, application server 130 may store locally (e.g., in memory 340) a separate user operating PIN 480 and send PIN 480 to the user of user device 110 through a reliable channel, such as an email account associated with the user. Operating PIN 480 may be required for future remote access to the secure mobile streaming service.

Figure 5:
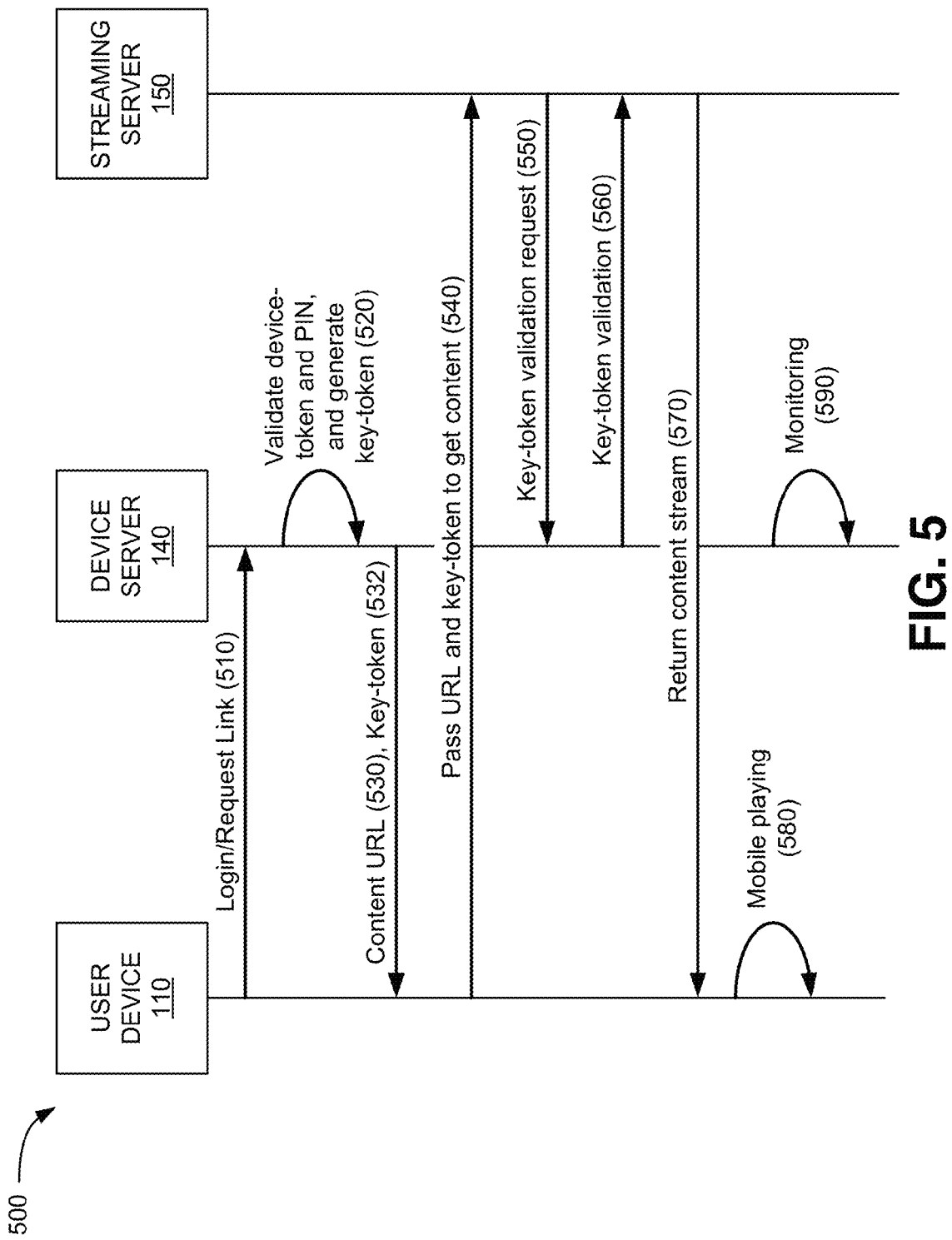
FIG. 5 is a diagram of additional exemplary communications for the network portion of FIG. 4.

FIG. 5 is a diagram of exemplary communications for a portion 500 of network 100. Communications in FIG. 5 may represent device authentication and content delivery procedures. As shown in FIG. 5, network portion 500 may include user device 110, device server 140, and streaming server 150. User device 110, device server 140, and streaming server 150 may include features described above in connection with, for example, FIGS. 1-4.

Communications described in FIG. 5 may take place in a public network environment, such as public network 190. For example, user device 110 (e.g., running the mobile application 420) may connect to device server 140 via a public Internet connection. User device 110 may provide a login request 510 to device server 140. Login request 510 may include, for example, device-token 460, the UDID and user ID (e.g., from provisioning request 430), and expiration time 462 that had been previously stored (e.g., in memory 260) by user device 110. The mobile application 420 may also request a user to enter operating PIN 480 and pass operating PIN 480 to device server 140 as part of the login process.

Device server 140 may receive login request 510 and may communicate with application server 130 (not shown) to validate device-token 460 and operating PIN 480, as indicated by reference number 520. In one implementation, application server 130 may apply the same hash algorithm used to issue device-token 460 during the registration process (FIG. 4). Application server 130 may apply the UDID, user ID, and expiration time 462 to the locally stored secret data to re-generate the hash value for device-token 460. Application server 130 may compare the re-generated hash value to the hash value received from user device 110. Since application server 130 may use a one-way hash algorithm and since it would be mathematically complex to reverse engineer the input parameters, any difference between the hash value received from user device 110 and the re-generated hash value would be indicative of an attempted hacking Application server 130 may also validate operating PIN 480 by comparing against the originally-stored value. If either the device-token 460 derived from login request 510 or the operating PIN do not match previously stored values, login request 510 will fail. In another implementation, application server 130 may share PIN 480, the hash algorithm, and the secret data with device server 140 so that device server 140 can regenerate the hash value to validate received device-token 460 without communicating to application server 130 during normal operations.

Assuming device server 140/application server 130 validate device-token 460 and operating PIN 480, device server 140 may return a content URL 530 (e.g., for particular streaming content requested by the user) and a key-token 532 to user device 110. Key-token 532 may include, for example, a unique alpha-numeric character string or hash value that includes a combination of user identification and secret data. Device server 140 may set key-token 532 for one-time use for a particular content stream. Once key-token 532 is used by user device 110 to start a streaming session, key-token 532 may be expired to prevent additional uses. In one implementation, content URL 530 and key-token 532 may be delivered via a secure channel (e.g., a Hypertext Transfer Protocol Secure (HTTPS) connection).

User device 110 may receive content URL 530 and key-token 532 from device server 140. User device 110 may use content URL 530 and key-token 532 to request streaming content from streaming server 150, as indicated by reference number 540. In response to request 540, streaming server 150 may validate key-token 532. For example, streaming server 150 may contact device server 140 to validate key-token 532, as indicated by reference number 550. Assuming the key-token of request 540 matches the key-token stored by device server 140, device server 140 may provide key-token validation 560. Alternatively, streaming server 150 may run the same hash algorithm used by device server 140 to generate key-token 532 if the secret used for generating key-token 532 is made available to streaming server 150.

Once key-token 532 is validated, streaming server 150 may begin streaming session 570 to provide the requested content stream to user device 110. Streaming session 570 (e.g., between streaming server 150 and mobile device 110) and subsequent session 570 management may be handled by a known streaming protocol. In one implementation, HTTP Live Streaming (HLS) may be used to encrypt streaming data and encryption keys may be delivered through a secure channel (e.g., HTTPS) before each streaming session 570 starts. Streaming server 150 may also ensure that key-token 532 can be used only once, and that any further attempt to use the same key-token will fail.

User device 110 may receive content via streaming session 570 and may present (e.g., play) the streaming content to the user, as indicated by reference number 580. After stream session 570 has been initiated, device server 140 may continue monitoring the stream by making sure key-token 532 is used by only one streaming session. Device server 140 may also monitor login attempts and disable user accounts if a login attempt has a particular number (e.g., 3, 5, 10, etc.) of failed login attempts.

Figure 6:
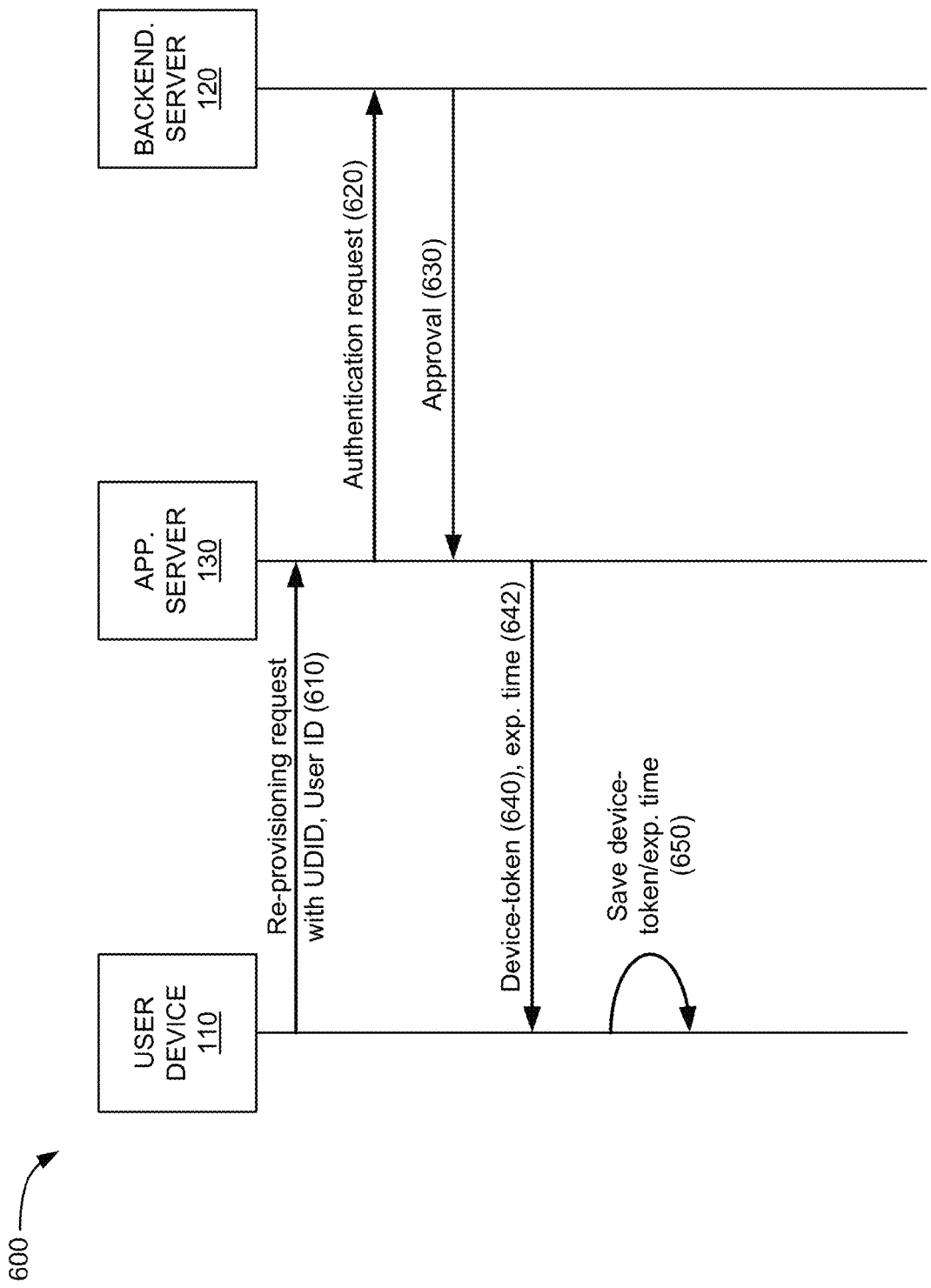
FIG. 6 is a diagram of further exemplary communications for the network portion of FIG. 4.

FIG. 6 is a diagram of further exemplary communications for network portion 400. Communications in FIG. 4 may represent re-authentication procedures for mobile application 420 on user device 110. As noted above, user device 110 may receive (e.g., from application server 130) device-token 460 with a particular expiration time 462. Device-token 460 may be valid, for example, for one or two weeks based on expiration time 462. When device-token 460 expires, user device 110 may obtain a new device-token 460 in order to continue to use mobile application 420. As shown in FIG. 6, network portion 400 may include devices and features described above in connection with, for example, FIG. 4.

Communications described in FIG. 6 may take place in a secure environment, such as private network 180. Thus, device-token 460 may not be distributed on the Internet and may only be saved to user devices 110 through reliable network channels. When mobile application 420 recognizes device-token 460 is expired, or when another server (e.g., device server 140) indicates device-token 460 is invalid, user device 110 may initiate re-authentication procedures within private network 180. User device 110 may send to application server 130 a re-provisioning request 610 that includes the user device UDID and the user ID.

Application server 130 may receive re-provisioning request 610 and may, in response, send an authentication request 620 to backend server 120. Similar to authentication request 440, authentication request 620 may validate the user ID to make sure the user is entitled to access the secure mobile streaming service. If the user is not authorized to access the service, backend server 120 may not authenticate the user and application server 130 may deny (not shown) re-provisioning request 610. Assuming the user is authorized to access the service, backend server 120 may provide an approval 630 to application server 130.

Based on approval 630, application server 130 may generate a new device-token 640 using, for example, a hash algorithm. The hash value for device-token 640 may be generated using the same hash algorithm described above with respect to device-token 460. Thus, in one implementation, new device-token 640 may include the UDID, the user ID, secret data, and an expiration time 642. Expiration time 642 may be a particular date and time or a time period for when device-token 640 is set to expire. In one implementation, application server 130 may store new device-token 640 locally (e.g., in memory 340) and may forward new device-token 640 and expiration time 642 to user device 110. In another implementation, application server 130 may store the hash algorithm and expiration date, but not new device-token 640.

User device 110 (e.g., running the mobile application) may save new device-token 640 and expiration time 642 in local memory (e.g., memory 260), as indicated by reference number 650. User device 110 (e.g., mobile application 420) may later use new device-token 640 and operating PIN 480 to conduct remote authentication procedures for accessing streaming content.

FIG. 7 is a flow chart of an example process for obtaining secure streaming content according to implementations described herein. In one implementation, process 700 may be performed by user device 110. In another implementation, some or all of process 700 may be performed by another device or group of devices, including or excluding user device 110.

As shown in FIG. 7, process 700 may include downloading a mobile application via a secure local network (block 710), requesting device authentication via the secure local network (block 720), and receiving and storing a device-token (block 730). For example, as described above in connection with FIG. 4, user device 110 may install mobile application 420, which may initiate a registration process. User device 110 may send to application server 130 a provisioning request 430 that includes a UDID and a user ID. Application server 130 generate device-token 460 (e.g., based on the UDID, user ID, and other information) and forward device-token 460 to user device 110. User device 110 (e.g., running the mobile application) may save device-token 460 and expiration time 462 in local memory (e.g., memory 260) for future use, as indicated by reference number 470.

Process 700 may include performing a mobile application login via a public network using the device-token and a user PIN (block 740). For example, as described above in connection with FIG. 5, user device 110 may provide a login request 510 to device server 140. Login request 510 may include, for example, device-token 460, the UDID and user ID (e.g., from provisioning request 430), and expiration time 462 that had been previously stored (e.g., in memory 260) by user device 110. The mobile application 420 may also pass operating PIN 480 to device server 140 as part of the login process.

Process 700 may also include receiving a content link and key-token for particular content (block 750), requesting content using the content link and key-token (block 760), and receiving and/or presenting a content stream for the particular content (block 770). For example, as described above in connection with FIG. 5, assuming device server 140/application server 130 validate device-token 460 and operating PIN 480, user device 110 may receive content URL 530 and key-token 532 from device server 140. User device 110 may use content URL 530 and key-token 532 to request streaming content from streaming server 150, as indicated by reference number 540. Once key-token 532 is validated, streaming server 150 may begin streaming session 570 to provide the requested content stream to user device 110. User device 110 may receive content via streaming session 570 and may present (e.g., play) the streaming content to the user, as indicated by reference number 580.

FIG. 8 is a flow chart of an example process for providing secure streaming content to user devices according to implementations described herein. In one implementation, process 800 may be performed by a group of devices including application server 130 and/or device server 140. In another implementation, some or all of process 800 may be performed by another device or group of devices, including or excluding application server 130 and/or device server 140.

As shown in FIG. 8, process 800 may include providing a mobile application via a secure network (block 810). For example, in implementations described above in connection with FIG. 4, user device 110 may send to application server 130 an application request 410 to download a mobile application 420. Application server 130 may receive request 410 and respond by downloading a mobile application 420 to user device 110. Mobile application 420 may be used by user device 110 to manage secure provisioning and mobile access to streaming video content.

Process 800 may further include receiving a UDID and user ID (block 820), providing a user device with a device-token of limited duration (block 830), and providing a user PIN via a separate communication (block 840). For example, in implementations described above in connection with FIG. 4, application server 130 may receive provisioning request 430 that includes a UDID and user ID. In response, application server 130 may send an authentication request 440 to backend server 120. Assuming the user is authorized to access the secure steaming service, application server 130 may generate device-token 460 using, for example, a hash algorithm. The hash value for device-token 460 may include the UDID, the user ID, secret data, and expiration time 462. Expiration time 462 may be a date and time or a time period for when the device-token is set to expire. Also, application server 130 may send PIN 480 to the user of user device 110 through a reliable channel, such as an email account associated with the user.

Process 800 may include receiving a login request including the device token (block 850), and validating the login request (block 860). For example, in implementations described above in connection with FIG. 5, device server 140 may receive login request 510 from user device 110 and may communicate with application server 130 to validate device-token 460 and operating PIN 480.

Process 800 may also include providing a URL and key-token for particular streaming content (block 870), validating the key-token (block 880), and monitoring access to a content stream associated with the URL (block 890). For example, in implementations described above in connection with FIG. 5, assuming a valid login request, device server 140 may return a content URL 530 (e.g., for particular streaming content requested by the user) and a key-token 532 to user device 110. Content URL 530 and key-token 532 may be used by user device 110 to request a streaming session from streaming server 150. Streaming server 150 may contact device server 140 to validate key-token 532. Alternatively, streaming server 150 may run the same hash algorithm used by device server 140 to generate key-token 532 if the secret used for generating key-token 532 is made available to streaming server 150. After stream session 570 has been initiated, device server 140 may continue monitoring the stream by making sure key-token 532 is used by only one streaming session. Device server 140 may also monitor login attempts and disable user accounts if a login attempt has a particular number (e.g., 3, 5, 10, etc.) of failed login attempts.

Systems and/or methods described herein may allow user devices to obtain secure streaming video. User devices may download an application for secure mobile streaming using a private network. The application may be registered within the private network to receive a device-token and user PIN. The user device/application may later use the device-token and user PIN to authenticate the user device/user and gain access to streaming content via a public network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method implemented by one or more computing devices, the method comprising:
   receiving, by one of the one or more computing devices and from a user device via a URL that is accessible only from within a private network, an application request for an application to manage secure provisioning and mobile access to streaming video content via a public network;
   validating, by the one or more computing devices, a user, of the user device, that initiated the request for the application;
   when the user of the user device is validated, transmitting, by one of the one or more computing devices and to the user device via the private network, the application;
   receiving, by one of the one or more computing devices and from the user device via the private network, a registration request for the application that was previously transmitted to the user device;
   generating, by one of the one or more computing devices, a device-token based on a unique device identifier (UDID) corresponding to the user device, other information in the registration request, and locally-stored secret data;
   sending, by one of the one or more computing devices, the device-token to the user device via the private network;
   receiving, by one of the one or more computing devices and via the public network, a login request from the application to present particular streaming content, wherein the login request includes the device-token;
   validating, by one of the one or more computing devices, use of the application based on the device-token; and
   sending, by one of the one or more computing devices, a content link and a key-token for the particular streaming content when the device-token is validated, wherein the key-token is generated from user identification data and other locally-stored secret data.

2. The method of claim 1, further comprising:
   receiving a request to validate the key-token;
   validating the key-token; and
   monitoring access to the particular streaming content based on the key-token.

3. The method of claim 1, further comprising:
   sending, to the user of the user device and via a different secure communication, a user personal identification number (PIN) associated with the application, wherein validating the use of the application further includes verifying the user PIN.

4. The method of claim 1, wherein the information in the registration request includes the UDID and a user identification (ID) associated with the user of the user device.

5. The method of claim 4, wherein the device-token is a hash value generated from the UDID, the user ID, an expiration time, and the locally-stored secret data.

6. The method of claim 1, further comprising:
streaming, to the user device and via the public network, a content stream based on the particular streaming content.

7. The method of claim 1, wherein the device-token includes an expiration time.

8. The method of claim 1, wherein the key-token for the particular streaming content includes a single-use restriction.

9. The method of claim 1, wherein the content link and the key-token are delivered using a Hypertext Transfer Protocol Secure (HTTPS) connection.

10. A system, comprising:
a memory to store a plurality of instructions; and
one or more processors configured to execute instructions in the memory to:
receive, from a user device via a URL that is accessible only from within a private network, an application request for an application to manage secure provisioning and mobile access to streaming video content via a public network;
validate a user of the user device that initiated the request for the application;
when the user of the user device is validated, transmit, to the user device and via the private network, the application in response to the application request,
receive, from the user device and via the private network, a registration request for the application, wherein the registration request includes a user ID and a unique device identifier (UDID) corresponding to the user device,
initiate a validation procedure for at least one of the user ID or UDID,
generate a device-token for the user device when the user ID or UDID is validated, wherein the device-token includes a hash value based on information in the registration request, locally-stored secret data, and an expiration date for the device-token,
send the device-token to the user device via the private network, wherein the device-token is required to permit the user device to receive a secure content stream via the public network,
generate a user personal identification number (PIN) associated with the application, when the user ID or UDID is validated, wherein the user PIN is required to permit the user device to receive a secure content stream via the public network,
send, to a user of the user device, the user PIN, wherein the user PIN is sent via a different communication method than is used for sending the device-token,
receive, via the public network, a login request from the application to
receive streaming content, wherein the login request includes the device-token that was sent via the private network,
validate use of the application based on the device-token, and
send, to the user device, a content link and a key-token for particular streaming content when the device-token is validated, wherein the key-token is generated from user identification data and other locally-stored secret data.

11. The system of claim 10, wherein, when validating use of the application, the one or more processor are further configured to verify the user PIN.

12. The system of claim 11, wherein the one or more processors are further configured to:
generate the key-token corresponding to the content link for particular streaming content,
send, to the user device, the key-token,
receive a request to validate the key-token, based on an attempt by the user device to access the content link, and validate the key-token.

13. The system of claim 12, wherein the one or more processors are further configured to:
deny access to the particular streaming content based on any subsequent attempt to re-use the key-token.

14. The system of claim 10, wherein the application automatically generates an application programming interface (API) function call to determine the UDID for the user device.

15. A method implemented by a user device, the method comprising:
sending, to an application server via a URL that is accessible only from within a secure local network, an application request for an application for secure mobile streaming via a public network;
receiving, after a user of the user device is validated, the application via the secure local network;
storing, in a memory of the user device, the application;
sending, to the application server and via the secure local network, an authentication request for the application, wherein the authentication request includes a unique device identifier (UDID) and a user identification (ID);
when the UDID or user ID is validated, receiving, from the application server and via the secure local network, a device-token for the application, wherein the device-token is based on the UDID, the user ID, an expiration time for the device-token, and secret data stored locally on the application server;
sending, to a device server and via the public network, the device-token that was received via the secure local network and a user PIN associated with the application;
receiving, via the public network and based on validation of the device-token and the user PIN, a content link and a key-token to access particular streaming content, wherein the key-token is generated from user identification data and other secret data stored locally on the device server;
requesting, via the public network and using the content link and the key-token, the particular streaming content; and
presenting the particular streaming content to the user.

16. The method of claim 15, further comprising:
generating an application programming interface (API) function call to determine the UDID for the user device.

17. A device, comprising:
a memory to store a plurality of instructions; and
a processor configured to execute instructions in the memory to:
send, to an application server via a URL that is accessible only from within a secure local network, an application request for an application for secure mobile streaming via a public network;
receive, after a user of a user device is validated, the application via the secure local network;
store, in the memory of the user device, the application,
send, via the secure local network, an authentication request for the application, wherein the authentication request includes a unique identification for the user device,
receive, via the secure local network, a device-token for the application, wherein the device-token is based on the unique identification, an expiration time for the device-token, and secret data stored locally on the application server, send, via the public network, a request to access streaming content, wherein the request to access streaming content includes the device-token that was received via the secure local network, and receive, via the public network and based on validation of the device-token, a content link and a key-token to access particular streaming content, wherein the key-token is generated from user identification data and other secret data stored locally on a device server.

18. The device of claim 17, where the processor is further configured to:

request, using the content link, the particular streaming content; and present the particular streaming content to the user of the user device.

\* \* \* \* \*